United States Patent [19]
Krause et al.

[11] Patent Number: 5,925,836
[45] Date of Patent: Jul. 20, 1999

[54] SOFT MAGNETIC METAL COMPONENTS MANUFACTURED BY POWDER METALLURGY AND INFILTRATION

[75] Inventors: Robert F. Krause, Valparaiso, Ind.; Harold R. Kokal, Glenwood, Ill.; Joseph H. Bularzik, Munster, Ind.

[73] Assignee: Magnetics International Inc., Burns Harbor, Ind.

[21] Appl. No.: 08/963,967

[22] Filed: Nov. 4, 1997

[51] Int. Cl.$^6$ ............................................. B22F 3/26
[52] U.S. Cl. ........................... 75/246; 419/23; 419/27
[58] Field of Search ....................... 75/246; 419/27, 419/23, 2

[56] References Cited

U.S. PATENT DOCUMENTS

| | | |
|---|---|---|
| 1,342,801 | 6/1920 | Gebauer . |
| 1,395,269 | 11/1921 | Gebauer . |
| 4,971,755 | 11/1990 | Kawano et al. ..................... 419/10 |
| 4,976,778 | 12/1990 | Berry et al. ....................... 75/245 |
| 5,212,019 | 5/1993 | Ryoke et al. ................. 428/694 BB |
| 5,594,186 | 1/1997 | Krause et al. ...................... 75/228 |

FOREIGN PATENT DOCUMENTS

| | | |
|---|---|---|
| 148533 | 7/1920 | United Kingdom . |

OTHER PUBLICATIONS

Semlak et al., "Rate of capillary rise of liquid metal in a higher melting metal powder compact," *Journal of Metals*, (Jan. 1957), pp. 63–64.

Semlak et al., "The rate of infiltration of metals," *Transactions of The Metallurgical Society of AIME*, (Jun. 1958), pp. 325–331.

Goetzel et al., "Mechanism of infiltration of porous powder–metallurgy parts," *Journal of Metals*, (Nov. 1964), pp. 901–905.

German, "Powder Metallurgy Science," Metal Powder Industries Federation, Princeton, NJ, (1984), pp. 208–209.

Klar et al. eds., *Metals Handbook® Ninth Edition*, vol. 7, American Society for Metals, Metals Park, Ohio, (1984), pp. 551–566.

German, *Liquid Phase Sintering*, Plenum Press, New York, (1985), pp. 160–163.

Lall, *Soft Magnetism Fundamentals for Powder Metallurgy and Metal Injection Molding*, Metal Powder Industries Federation, Princeton, NJ, (1992), p. 53.

Ciekot et al., "Infiltrated iron matrix powder composition for magnetic applications," Societe Francaise de Metallurgie et de Materiaux, (France) (1992).

Thümmler et al., *An Introduction to Powder Metallurgy*, (1993), pp. 227–228.

Frayman et al., "The role of the secondary operations in the manufacturing of P/M automotive components for soft magnetic applications," Presented at 1996 World Congress of Powder Metallurgy & Particulate Materials, Jun. 16–21, 1996, pp. 1–12.

Laboratory Data Sheet, 283LF Infiltrant, Pyron Metal Powders, Greenback, TN, (Nov. 19, 1996), one page.

Laboratory Data Sheet, 681 Infiltrant, Pyron Metal Powders, Greenback, TN, (Nov. 19, 1996), one page.

Frayman, "Effects of post processing on DC magnetic properties," *MPIF Magnetic Seminar*, (May 6–7, 1997), Indianapolis, IN.

Anonymous, "Infiltrant copper powder EF–985 and LR–99," Acu Powder International LLC, Union, NJ, undated.

*Primary Examiner*—Ngoclan Mai
*Attorney, Agent, or Firm*—Marshall, O'Toole, Gerstein, Murray & Borun

[57] ABSTRACT

Corrosion-resistant, soft magnetic metal components manufactured by powder metallurgy and infiltration processes are disclosed. The magnetic components are manufactured by a powder metallurgy process using acicular metal particles to form a skeleton, and thermally infiltrating the skeleton.

37 Claims, 5 Drawing Sheets

SOFT MAGNETIC METAL COMPONENTS MANUFACTURED BY POWDER METALLURGY AND INFILTRATION

FIELD OF THE INVENTION

The present invention relates to corrosion-resistant, soft magnetic metal components manufactured by powder metallurgy and infiltration processes. More particularly, the present invention relates to soft magnetic metal components that are formed by powder metallurgy from a volume of acicular metal particles having a total surface area-to-weight ratio less than about one-fifth of the total surface area-to-weight ratio of an identical volume of spherical or near spherical particles having a size typically used in powder metallurgy of the same metal, and that are thermally infiltrated.

BACKGROUND OF THE INVENTION

The manufacture of metal components, including soft magnetic metal components, using a metal powder as the raw material, i.e., powder metallurgy, has been used for decades. Powder metallurgy is an excellent method of shaping metals into a predetermined design because of an efficient use of energy and materials. Powder metallurgy provides metal components of near net shape, and, therefore, is a common method of manufacturing large volumes of close tolerance metal components.

The manufacture of a metal component by powder metallurgy includes three basic steps to convert a metal powder into a metal component. Each step is controlled such that the finished metal component conforms to design specifications both within a single production batch and also between production batches.

The first step is preparation of a metal powder mixture. The metal powder mixture typically includes: (1) the metal powder being used as the material of construction, and (2) a lubricant. The metal powder can be a single metal species or can be a combination of different types of metal species. The metal powder particles typically are spherical or near spherical in shape. As used hereafter, the term "spherical" designates both a spherical and a near spherical shape. The lubricant typically is added to minimize friction between the metal powder and the tooling during a compaction, or pressing, step. The lubricant is present in an amount of up to about 2% by weight of the metal powder mixture. Alternatively, a lubricant is omitted from the metal powder mixture, but is applied to the die wall and tooling.

After forming the metal powder mixture, the mixture is pressed in a die of predetermined shape. During the pressing operation, the spherical metal powder particles deform to form a compressed article, termed a "green compact," having about 40% the original height of the metal powder height. The shape of the green compact is determined by the geometry of the die. The green compact can be handled, but is fragile.

The density of the green compact (i.e., "green density") is determined primarily by the applied pressing load and the amount of lubricant. The ability of the green compact to maintain its predetermined shape without cracking, fracturing, or crumbling during handling is referred to as the "green strength" of the compact. If green strength is too low, the green compact easily crumbles or cracks when removed from the die, which makes manufacture into a metal component difficult to impossible.

After pressing, the green compact is subjected to an elevated temperature to form a metal component. The green compact is heated at a sufficiently high temperature and for a sufficient time to decompose, or pyrolyze, the lubricant, and to increase the density and strength of the metal component.

Conventionally, the green compact is heated in steps, initially to a first temperature to pyrolyze the lubricant, then to a second higher temperature to increase the density and strengthen the metal component, i.e., to sinter the metal component. A typical sintering furnace comprises a continuously running mesh belt which carries the green compacts through the furnace. Heating cycle times typically are about 1 to 3 hours, with about 20 to about 60 minutes at a sintering temperature in excess of 1000° C. The sintered metal component, after cooling, then is subjected to optional secondary operations, such as deburring, to provide the final finished metal component.

The strength of a metal component is directly related to the density of the metal component, which in turn is directly related to the density of the green compact. Metal components manufactured by the above-described traditional powder metallurgy process, and using metal powder particles having spherical or near-spherical geometry, have a theoretical density of about 88% to about 92%. As used here and hereafter, the term "100% theoretical density" is defined as the density of the metal, metals, alloy, and/or alloys forming the metal component. "Percent (%) theoretical density" is defined as the ratio of green compact density, or metal component density, to the density of the metal, metals, alloy, and/or alloys from which the green compact or metal component is manufactured, multiplied by 100.

Metal components having a % theoretical density of about 88% to about 92% often exhibit low strength, and are susceptible to corrosion due to the porosity of the metal component. Such metal components are unsuitable for many practical applications because they are subject to failure. Persons skilled in the art have used various techniques, including "warm" pressing, pressing the metal component a second time (i.e., "sizing" or "restriking"), or hot isostatic pressing to increase the density of the metal component. However, each of the above-described techniques is more costly than a traditional powder metallurgy process, and provides metal components having a density typically no greater than about 96% of theoretical density.

Conventionally, metal powder particles used in powder metallurgy are spherical or near-spherical in shape. Spherical metal powder particles, typically minus 100 mesh, or about 200 microns or smaller, in size, are blended with a die lubricant and compacted into a predetermined shape. The amount of lubricant used with spherical metal powder is about 0.25% to about 2%, by weight of the metal powder mixture. After pressing, a green compact containing the spherical metal powder has a green density typically less than 92% of theoretical density. This relatively low green density is attributed to: (1) the resistance of spherical metal powder to efficiently compress to high densities in a die (i.e., spheres inherently resist compaction and arrays of spheres have substantial void spaces between the spheres), and (2) the relatively higher volume occupied by the low density lubricant (which decreases the overall density of the green compact). During heating and sintering, the lubricant is pyrolyzed, the metal particles coalesce or sinter together causing a slight volume decrease, and the density of the resulting metal component is increased, but typically to less than 93% of the theoretical density of the metal or metal alloy. The low density of the metal component adversely affects performance, and promotes corrosion due to a relatively high porosity.

Spherical metal powder particles having a size typically used in powder metallurgy (e.g., minus 100 mesh, or about 200 μm, in size, or smaller) require relatively large amounts of lubricant because each powder particle must be coated with a minimum amount of lubricant, and a volume of spherical powder particles of this size has a large surface area-to-weight ratio. It is desirable to minimize the amount of lubricant in the metal powder mixture in order to minimize the die volume occupied by the lubricant, and thereby increase the density of the green compact. Investigators attempting to minimize the amount of lubricant present in the metal powder mixture have addressed the morphology, i.e., the size and shape, of the metal powder particles.

Krause et al. U.S. Pat. No. 5,594,186, incorporated herein by reference, discloses substantially linear, acicular metal particles having a substantially triangular cross section. The acicular particles can be used in the manufacture of metal components by powder metallurgy, and overcome the disadvantages of spherical metal particles. In particular, the acicular particles disclosed in Krause et al. U.S. Pat. No. 5,594,186 provide powder metallurgy components having a theoretical density at least 95% of theoretical density.

A volume of the acicular metal particles disclosed in Krause et al. U.S. Pat. No. 5,594,186 has a reduced surface area-to-weight ratio compared to a volume of spherical powder particles typically used in powder metallurgy, and, therefore, the amount of lubricant needed to coat the volume of acicular metal particles is reduced. The reduced amount of lubricant results in an increased green density, and, subsequently, an increased density of the finished metal component.

Metal components containing a magnetizable metal, prepared by powder metallurgy, and having a high theoretical density exhibit excellent magnetic properties. Investigators have found that magnetic properties are directly related to percent theoretical density, and, therefore, magnetic metal components prepared by a powder metallurgy process from the acicular metal particles disclosed in Krause et al. U.S. Pat. No. 5,594,186 are expected to exhibit excellent magnetic properties. But, metal components prepared from iron particles disclosed in Krause et al. U.S. Pat. No. 5,594,186 generally do not exhibit sufficient corrosion resistance to be useful in many commercial applications.

In particular, a powder metallurgy magnetic component exhibits good magnetic properties by exhibiting an induction at an applied field of 100 Oe (Oersteds), or $B_{100}$, of at least about 12 kG (kilo-Gauss), and typically about 12 to about 15 kG; and a coercive force, or $H_c$, measured from an applied field of 100 Oe of about 3 Oe or less, and typically about 1.5 to about 2.5 Oe. The higher the $B_{100}$, and the lower the $H_c$, the better the magnetic properties of the metal component.

In addition to good magnetic properties, the metal component also must demonstrate good corrosion resistance for practical applications. This is especially important in magnetic metal components such as rotor cores used in brushless dc motors, and sensor rings used in automotive antilock breaking systems (ABS)

Currently, methods are available to impart corrosion resistance to powder metallurgy metal components, but each method has a disadvantage. For example, a corrosion-resistant coating can be applied to the magnetic metal component. One example of a protective coating is a reactive coating, such as a phosphate or a steamed blue oxide coating. Another example is to simply apply a coating composition, such as a paint or an epoxy. The disadvantage of protective coatings is that if the coating is damaged, then corrosion of the metal component begins at the damaged area and spreads under undamaged areas of the coating.

Corrosion resistance can be imparted by steam treating the magnetic metal component in an oxygen-rich atmosphere. Steam treating oxidizes the component surfaces, including open pore surfaces that extend to the interior of the component. However, steam treating significantly decreases the magnetic properties of the metal component. See L. I. Frayman et al., "The Role of Secondary Operations in the Manufacturing of P/M Automotive Components for Soft Magnetic Applications," Presented at 1996 World Congress on Powder Metallurgy & Particulate Materials, Jun. 16–21, 1996, Washington, D.C.

Another common approach to impart corrosion resistance to a powder metallurgy component is to use a base powder composition that is itself corrosion resistant. For example, typical 400 series stainless steels exhibit excellent corrosion resistance, and metal components, such as ABS sensor rings, have been made of stainless steel. The serious disadvantages of this approach is the relatively poor magnetic properties of stainless steel compared to iron, and the relatively high cost of the stainless steel alloy, as well as increased manufacturing costs.

A third approach to impart corrosion resistance is infiltration of a magnetizable metal component with a corrosion-resistant metal or alloy. For example, infiltrating copper into an iron-based powder metallurgy metal component has been practiced for decades in order to increase the density, strength, corrosion resistance, machinability, and conductivity of the power metallurgy metal component.

In an infiltration process, the term "skeleton" refers to a compacted matrix of metal particles having a network of solid particles that remain throughout the infiltration process. The skeleton provides a system of interconnected pores and channels of a size range that permits unimpeded flow of a liquid metal by capillary action. The term "infiltrant" refers to a metal or alloy that infiltrates the pores of the skeleton. The infiltrant metal or alloy has a melting point below the melting point of the metal or alloy of the skeleton.

During infiltration, a mass of a liquid metal, i.e., an "infiltrant," flows through and fills the pore system of a solid-phase powder metallurgy metal compact, i.e., a "skeleton." Infiltration, therefore, is an excellent method of producing powder metallurgy metal components of near 100% theoretical density by filling the pores of a compressed metal skeleton with a lower-melting metal infiltrant. This technique has the advantage of increasing the density of the metal component without the expenditure of external work, like extra pressing operations, to reduce or close the void spaces present in pressed and sintered metal components.

Infiltration can be performed on either green or sintered metal compacts formed by powder metallurgy techniques. The metal compact provides a solid skeleton into which liquid metal is introduced during a heating step. The liquid metal is introduced into the metal compact from an external reservoir, such as a mass, e.g., a slug, of the infiltrant metal, that is in contact with a surface of the metal skeleton and is melted during the heating step. The liquid metal is drawn into the open pore structure of the metal skeleton and fills the pores of the skeleton by capillary action. The liquid metal can pass down through the metal skeleton, or can wick up through the metal skeleton.

Examples of infiltrated skeletons include Fe (iron)-Cu (copper) (skeleton-infiltrant), TiC (titanium carbide)-Ni (nickel), Co (cobalt)-Cu, W (tungsten)-Ag (silver), W—Cu, WC (tungsten carbide)-Ag, and Mo (molybdenum)-Ag.

Traditionally, persons skilled in the art considered that infiltration required an open and interconnected pore structure, and thus, the metal skeleton must have at least 10% porosity. See, R. M. German, "Liquid Phase Sintering," Plenum Press, New York, N.Y., pages 160–163 (1985). In addition, the liquid metal infiltrant should have a low viscosity and sufficiently wet the metal skeleton, and no intermediate compounds should form between the metal skeleton and liquid infiltrant because such compounds could block the infiltration path. Ideally, solubility between the metal skeleton and liquid infiltrant is low. To prevent swelling and surface erosion caused by the liquid infiltrant dissolving the metal skeleton as it enters the skeleton, it is common to use a saturated liquid composition as an infiltrant, i.e., an alloy as opposed to a pure metal.

Swelling of the skeleton during infiltration is a common disadvantage, with the magnitude of the swelling related to the metal skeleton porosity, the carbon content of the metal, and the extent of a reaction between the skeleton and infiltrant. Swelling originates from a skeleton infiltrant interaction due to the penetrating liquid infiltrant. Swelling results in a dimensional change of the metal component. Accordingly, such dimensional changes must be factored into the design of the metal component, or secondary process steps are required to machine the metal component back to its correct dimensions. However, the secondary process steps remove the infiltrant from the surface of the skeleton, thereby lowering corrosion resistance. Accordingly, it is important to minimize or eliminate swelling during the infiltration process. The present invention limits swelling to a 2% or less, and typically about a 1% or less, volume increase of the skeleton during infiltration.

The above disadvantages are encountered when infiltrating both magnetic and nonmagnetic metal components manufactured by powder metallurgy. However, magnetic metal components have demonstrated a very serious additional disadvantage when subjected to an infiltration process. In particular, the publication "Effects of Post Processing on DC Magnetic Properties," Leonid I. Frayman, MPIF Magnetic Seminar, May 6–7, 1997, Indianapolis, Ind., (Frayman publication) discloses that infiltrating 410L stainless steel with copper essentially destroyed the magnetic properties of the magnetic metal component. The Frayman publication is discussed in detail hereafter.

J. Ciekot et al., "Powder Metallurgy Materials Featuring Specific Physical Properties," Paper No. 12, Societe Francaise de Metallurgie et de Materiaux, Paris, France, Apr. 6–8, 1992, pages 12–1 to 12–6, (1992), discloses a porous metal skeleton (35–45% porosity) infiltrated with copper. The resulting infiltrated metal component exhibits excellent electric properties, and although the magnetic properties are not adversely affected, the magnetic properties are too low for practical applications. Ciekot et al. disclose that an open or high porosity is necessary to provide suitable electric properties, and that such a porosity is achieved by using a spherical iron powder to manufacture the skeleton.

SUMMARY OF THE INVENTION

The present invention is directed to soft magnetic metal components prepared by conventional powder metallurgy and infiltration processes. The soft magnetic metal component comprises a skeleton prepared from a volume of acicular metal particles having a total surface area-to-weight ratio that is less than about one-fifth of the total surface area-to-weight ratio of an identical volume of spherical particles having a size typically used in powder metallurgy of the same metal, and preferably from substantially linear, acicular metal particles having a substantially triangular cross section. The powder metallurgy process utilizes a pressing step to form a green compact, i.e., a green skeleton, from a metal particle mixture, and a heating step to provide a dense skeleton. The metal skeleton, either simultaneously with or after the heating step, is infiltrated with an infiltrant metal that: (a) improves the corrosion resistance of the resulting soft magnetic metal component, (b) increases the density of the metal component, (c) increases the strength of the metal component, and importantly, (d) does not significantly impair the magnetic properties of the magnetic metal component.

In particular, the present invention is directed to providing a magnetic metal component from metal particles by powder metallurgy and infiltration processes from a volume of acicular metal particles having a total surface area-to-weight ratio that is less than about one-fifth of the total surface area-to-weight ratio of an identical volume of spherical particles of the size typically used in powder metallurgy of the same metal. In accordance with one important aspect of the present invention, the volume of acicular metal particles comprises substantially linear, acicular metal particles having a substantially triangular cross section.

In one important aspect of the present invention, the infiltration step is conducted after the steps of forming a metal skeleton from the acicular metal particles and sintering the skeleton. In another aspect of the prevent invention, the infiltration step is conducted after the step of forming the metal skeleton from the acicular metal particles and simultaneously with the sintering step.

In accordance with yet another aspect of the present invention, the acicular metal particles are admixed with particles of an infiltrant metal, preferably in the form of a powder, to provide a metal particle mixture. The infiltrant metal has a melting point lower than the melting point of the acicular metal particles. The metal particle mixture, which typically further comprises a lubricant, is formed into a green metal skeleton by powder metallurgy techniques, e.g., pressing the metal particle mixture. Then, the green metal skeleton is heated to a temperature sufficient to pyrolyze the lubricant and melt the infiltrant metal particles, and is held at that temperature for a sufficient time to infiltrate and sinter the metal skeleton, and thereby form an infiltrated metal component.

Yet another aspect of the present invention is to coat the acicular metal particles with a coating of an infiltrant metal to provide coated acicular metal particles. The coated acicular metal particles are formed into a green metal skeleton by powder metallurgy techniques, and subsequent heating of the green metal skeleton sinters the skeleton and also melts the coating of the infiltrant metal, thereby infiltrating the skeleton to form a magnetic metal component.

Another important aspect of the present invention is to provide an infiltrated magnetic metal component. The magnetic metal component comprises a skeleton of a magnetizable metal and an infiltrant. The skeleton is prepared from acicular magnetic metal particles disclosed in Krause et al. U.S. Pat. No. 5,594,186. The infiltrant comprises a metal or an alloy having a lower melting point than the metal of the skeleton. The infiltrant is present in the magnetic metal component in an amount of about 0.1% to about 10%, based on the weight of the magnetic metal component. The magnetic properties of the infiltrated magnetic metal component are essentially the same as, or equal to, the magnetic properties of an identical magnetic metal skeleton that is not infiltrated, i.e., the infiltrated magnetic metal component has magnetic properties that are not significantly impaired when compared to an identical, but noninfiltrated, magnetic metal component, i.e., a corresponding, noninfiltrated metal component.

Another aspect of the present invention is to provide a method of increasing the corrosion resistance and density of a metal component manufactured by powder metallurgy, without adversely affecting the magnetic properties of the metal component. The method comprises: (a) pressing a metal particle mixture into a green compact, or green skeleton; (b) heating the green skeleton to pyrolyze the lubricant, if present, and form a skeleton; (c) optionally sintering the skeleton to form a sintered skeleton; and (d) infiltrating the skeleton, or sintered skeleton, with an infiltrant metal to form a magnetic metal component. The infiltrant coats and fills the pores of the metal skeleton to increase density, and impart corrosion resistance to the metal component. In contrast to the prior art, infiltration does not adversely affect magnetic properties of the metal component because the metal component is prepared from a metal particle mixture containing a volume of acicular metal particles having a total surface area-to-weight ratio that is less than about one-fifth of the total surface area-to-weight ratio of an identical volume of spherical particles having a size typically used in powder metallurgy of the same metal.

BRIEF DESCRIPTION OF THE DRAWINGS

The file of this patent contains at least one drawing executed in color. Copies of this patent with a color drawing will be provided by the Patent and Trademark Office upon request and payment of the necessary fee.

The above and other aspects and advantages of the present invention will become apparent from the following detailed description of the preferred embodiments taken in conjunction with the drawings, wherein.

DETAILED DESCRIPTION OF THE PREFERRED EMBODIMENTS

Figure 1:
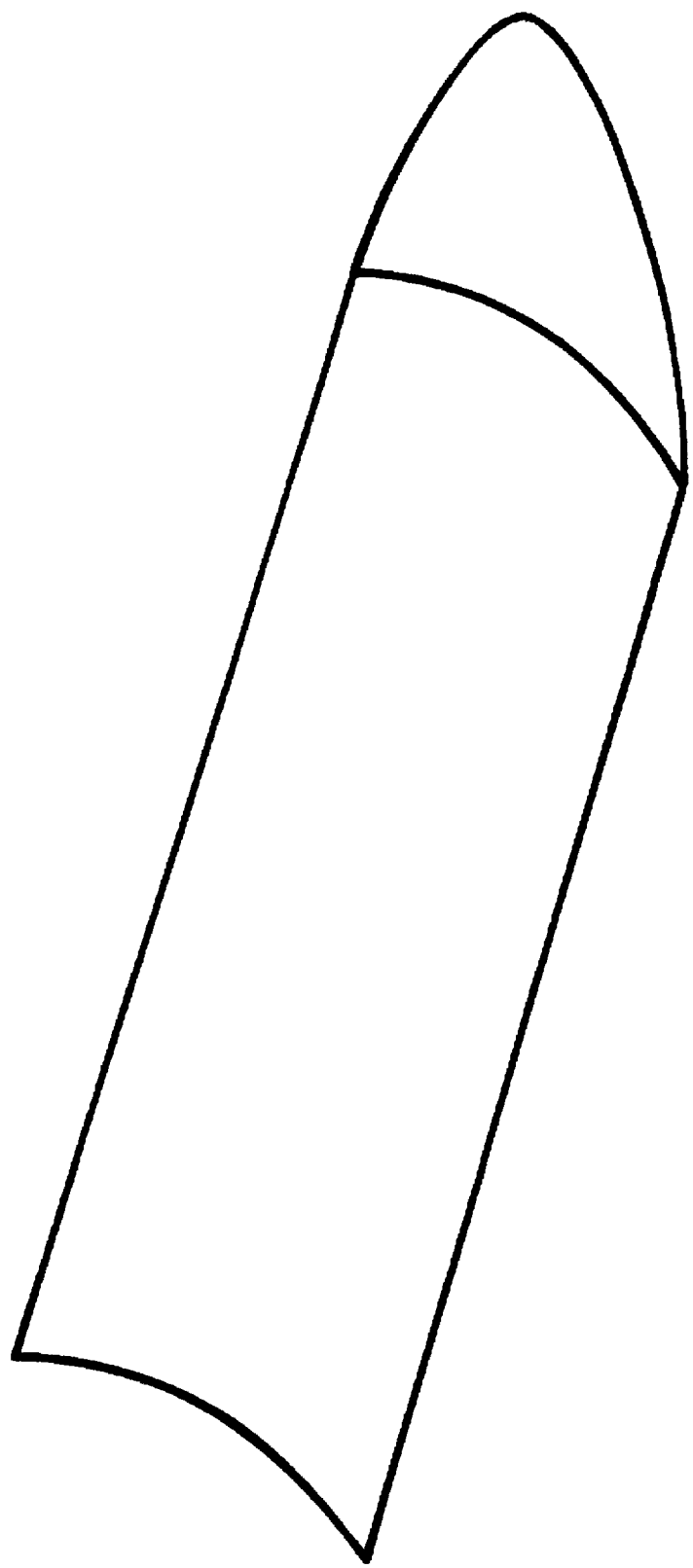
FIG. 1 is a perspective view of an acicular metal particle used in the present method of forming a magnetic, infiltrated metal component.

A magnetic component of the present invention is prepared from acicular metal particles, and preferably metal particles disclosed in Krause et al. U.S. Pat. No. 5,594,186, by powder metallurgy and infiltration processes. The powder metallurgy process is a traditional powder metallurgy process comprising the steps of: (1) forming a metal particle mixture comprising the acicular metal particles, (2) pressing the metal particle mixture to form a green compact, or green skeleton, containing the compressed acicular metal particles, (3) heating the green skeleton at a sufficient temperature and for a sufficient time to pyrolyze any lubricant present in the metal particle mixture to form a skeleton, (4) optionally sintering the skeleton at a sufficient temperature for a sufficient time to impart additional strength to the skeleton and form a sintered skeleton, and (5) cooling the skeleton or sintered skeleton. The present powder metallurgy method provides a green skeleton and a heated and/or sintered skeleton having a density of at least 92%, and typically at least 95%, of theoretical density and a finished skeleton of essentially the identical size and shape of the green skeleton.

The infiltration process utilizes an infiltrant metal, or alloy, having a melting point lower than the melting point of the acicular metal particles of the skeleton. The infiltration process fills the voids between the compressed acicular metal particles of the skeleton or sintered skeleton. If used in a slight excess over the amount needed to fill the void volumes, the infiltrant coats the surface of the skeleton or sintered skeleton.

The infiltrant can be introduced into the skeleton by various methods, such as, (a) by melting a mass of the infiltrant and allowing the liquid infiltrant to flow through the solid skeleton by capillary forces and fill the voids in the skeleton, (b) by admixing a powder of the infiltrant with the acicular metal particles during formation of the metal particle mixture to position solid infiltrant in the voids of the skeleton, such that the subsequent heating and sintering steps (3) and (4) melt the solid infiltrant to fill voids in the skeleton, or (c) by coating the acicular metal particles with the infiltrant, e.g., electrolytically or chemically coating the acicular metal particles with an infiltrant, such that the subsequent heating and sintering steps (3) and (4) melt the infiltrant to fill the voids in the skeleton.

Infiltration can be performed simultaneously with steps (3) and (4), i.e., the heating step and the sintering step, of the powder metallurgy process. Alternatively, infiltration can be performed as a separate process step, i.e., a second heating step, after the sintering step (4) or the cooling step (5) of the powder metallurgy process.

A present magnetic metal component, therefore, is manufactured by first forming a metal particle mixture. The metal particle mixture typically comprises: (1) acicular metal particles, and (2) 0% to about 0.5% by weight of a lubricant. In embodiments wherein the metal particle mixture is free of a lubricant, a lubricant coating is applied to the inside surfaces of the die. Powder metallurgy lubricants are well known in the art, and include, for example, lubricants disclosed in Krause et al. U.S. Pat. No. 5,594,186, incorporated herein by reference.

Other optional components can be incorporated into the metal particle mixture to perform a predetermined function. As disclosed above, the metal particle mixture also can contain an infiltrant in the form of a powder. The infiltrant is a metal, alloy, or mixture of metals and/or alloys, and has a melting point below the melting point of the acicular metal particles. By incorporating the infiltrant into the metal particle mixture, the infiltrant is positioned to fill the voids between the compressed metal particles of the skeleton during subsequent heating and sintering steps.

The major component of the metal particle mixture is the acicular metal particles. The metal particles are present in the metal particle mixture in an amount of at least 87.5% (i.e., 87.5% or more) by weight, when optional components in addition to the lubricant are present in the metal particle mixture. If the metal particle mixture contains essentially only the acicular metal particles and the lubricant, the metal particles are present in an amount of about 99.5% to 100%.

and preferably about 99.6% to about 99.985%, by weight of the metal particle mixture. To achieve the full advantage of the present invention, the acicular metal particles are present in an amount of about 99.75% to about 99.985%, by weight of the metal particle mixture. If the metal particle mixture contains the infiltrant, the infiltrant is present in an amount of about 0.1% to about 10%, and preferably about 1% to about 6%, by weight of the metal particle mixture.

The specific identity of the metal particles in the metal particle mixture is not limited, as long as the metal particles are magnetic, or can be magnetized, and can be manufactured into a metal component by powder metallurgy techniques. The metal particles can comprise a single species of metal particles, e.g., all the particles are iron particles, or a combination of metal particle species.

Nonlimiting examples of types of metal particles include, but are not limited to, iron, iron containing 0.05% to 1.5%, phosphorus, iron alloyed with aluminum or silicon, iron/nickel alloys, ferritic stainless steel, cobalt, iron/copper alloys, nickel/cobalt alloys, and mixtures thereof.

An important feature of the present invention is the size and shape of the metal particles. In particular, the metal particles utilized in the present invention are acicular particles, as opposed to a spherical powder. A volume of the acicular metal particles has a total surface area-to-weight ratio that is less than about one-fifth of the total surface area-to-weight ratio of an identical volume of spherical particles having a size typically used in powder metallurgy of the same metal, i.e., about 200 microns or less, such as about 10 microns to about 200 microns. Preferred acicular metal particles are disclosed in Krause et al. U.S. Pat. No. 5,594,186.

The acicular metal particles disclosed therein are sufficiently small to effectively pack together and yield a skeleton of high density. However, the metal particles cannot be of such small particle size that the particles have the shape of, or behave like, spheres. Spherically shaped particles do not effectively pack together to form a dense skeleton. Spherically shaped metal particles also resist compaction into a dense skeleton. The metal particles useful in the present invention have a size and shape such that the total surface area-to-weight ratio for a volume of particular metal particles is about 20% or less, of the total surface area-to-weight ratio of an identical volume of a conventional spherical powder having a size typically used in powder metallurgy of the same metal, and produce metal components having a much higher density than components manufactured from spherically shaped particles having a size typically used in powder metallurgy.

The preferred metal particles are substantially linear, acicular particles having a substantially triangular cross section as illustrated in the embodiment depicted in FIG. 1. The metal particles can be linear, or can be slightly curved along the longitudinal axis (i.e., the length of a chord connecting the ends of a metal particle is at least 95% of the length of the metal particle), without adversely affecting a metal component prepared by powder metallurgy.

The preferred acicular metal particles of substantially triangular cross section have a length of about 0.006 to about 0.20 inches, a base of about 0.002 to about 0.05 inches, and a height of about 0.002 to about 0.05 inches. Preferably, the acicular metal particles have a length of about 0.01 to about 0.18 inches, a base of about 0.003 to about 0.04 inches, and a height of about 0.003 to about 0.04 inches. To achieve the full advantage of the present invention, the acicular metal particles have a length of about 0.015 to about 0.16 inches, a base of about 0.004 to about 0.035 inches and a height of about 0.004 to about 0.035 inches.

The preferred acicular metal particles also have an aspect ratio (i.e., length-to-base ratio) at least 3 to 1, and preferably at least 5 to 1. To achieve the full advantage of the present invention, the acicular metal particles have an aspect ratio of about 5 to 1 to about 20 to 1.

Figure 2:
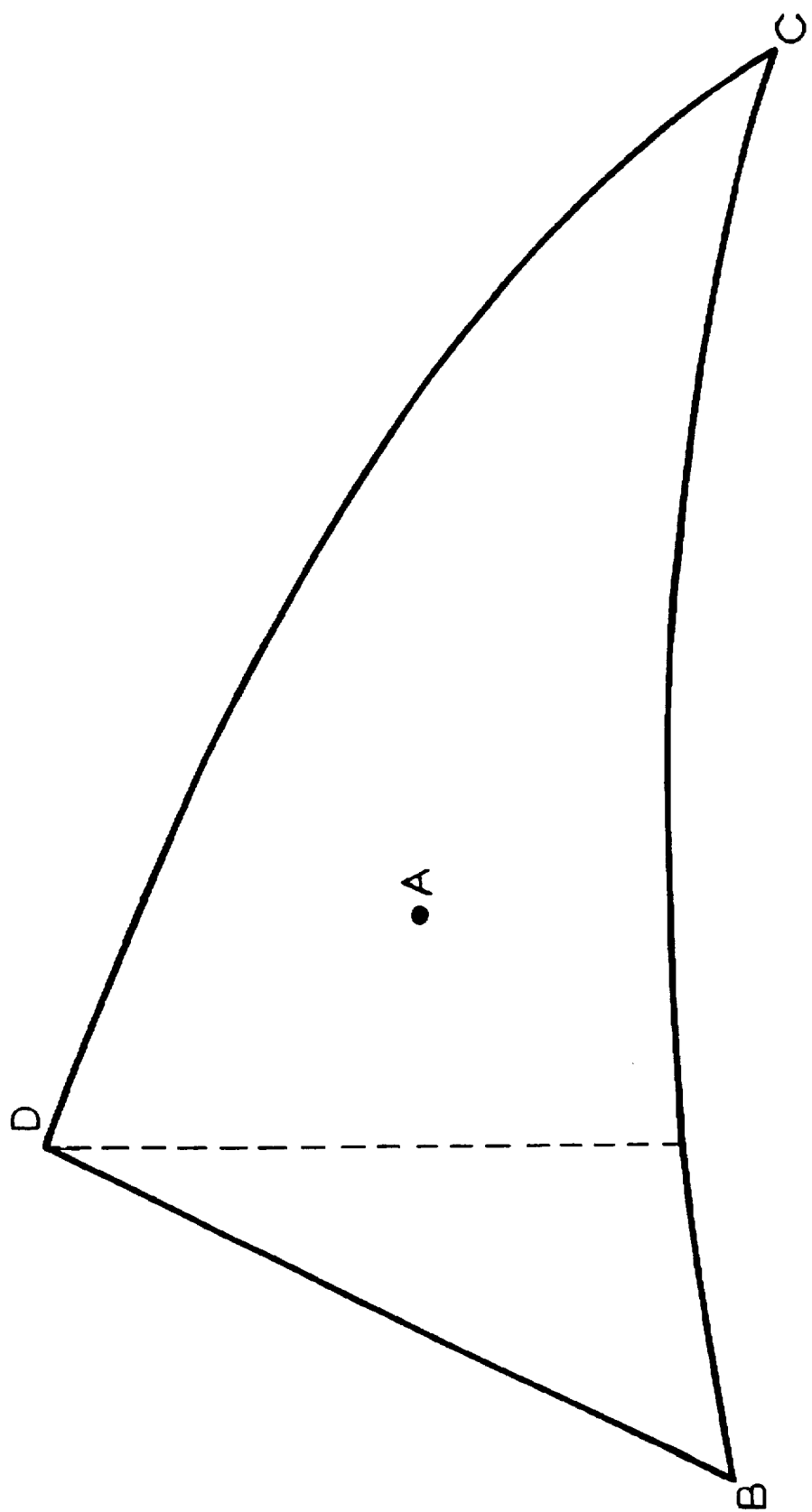
FIG. 2 is a cross sectional view of one embodiment of an acicular metal particle used in the present method.

The preferred acicular metal particles are not spiralled, but are substantially linear, elongated particles having a substantially triangular cross section, as illustrated in an embodiment depicted in FIG. 2. In particular, with reference to FIG. 2, when viewed from a point A in the center of the particle, the metal particle has a first longitudinal surface that is concave, a second longitudinal surface that is convex, and a third longitudinal surface that is planar or concave. Preferably, the third longitudinal surface is planar. With further respect to FIG. 2, segment B-C illustrates the base, and segment D-E illustrates the height of the substantially triangular cross section.

It should be understood that useful acicular metal particles having a substantially triangular cross section are not limited to the embodiment depicted in FIG. 2. The acicular metal particles can have longitudinal surfaces that are independently convex, concave, or planar.

The substantially linear, nonspiralled metal particle depicted in FIG. 1 has a shape that permits improved deformation and interlocking between acicular metal particles in the die. An increase in deformation and interlocking between metal particles increases the green strength of the green compact (i.e., green skeleton) and the final density of the skeleton and the infiltrated magnetic metal component. In comparison, spherical particles have a poor ability to deform and interlock, and green compacts and metal components prepared from spherical particles have a relatively low density.

To further increase interlocking between metal particles and to more effectively fill the die cavity, the acicular metal particles of substantially triangular cross section have a height-to-base ratio of about 0.08:1 to about 1:1. In addition, a major proportion of the metal particles have a triangular cross section wherein the height-to-base ratio is about 0.2:1 to about 1:1, and preferably about 0.3:1 to about 1:1. To achieve the full advantage of the present invention, the metal particles of substantially triangular cross section have a height-to-base ratio of about 0.5:1 to about 1:1.

If desired, the acicular metal particles can be coated, for example, electrolytically or chemically, with the infiltrant. The infiltrant then is positioned, prior to the powder metallurgy process, to fill the voids between the compressed acicular metal particles of the green skeleton during subsequent heating and sintering steps. The coated acicular metal particles contain about 0.1% to about 10%, by weight, of the infiltrant.

The metal particle mixture is prepared by simply admixing the acicular metal particles with the lubricant, if present, and any other optional ingredients, like an infiltrant powder, until the mixture is homogeneous. The metal particle mixture then is introduced into a die of predetermined size and shape.

The metal particle mixture in the die then is subjected to a pressing operation, and preferably a uniaxial pressing operation, to form a green compact, or green skeleton. The metal particle mixture is pressed at about 60,000 to about 130,000 pounds per square inch (psi), and preferably at about 80,000 to about 120,000 psi. Due to the size and geometry of the acicular metal particles, a single pressing operation provides a green skeleton having a density at least 92%, and typically at least 95%, of the theoretical density of the metal.

The green skeleton then is heated to pyrolyze the lubricant, if present, and form a skeleton, which functions as the magnetic core of the finished metal component. The skeleton then can be sintered, which bonds the acicular metal particles and strengthens the skeleton, to form a sintered skeleton.

The heating and sintering process conventionally is a two- to three-hour heating cycle, wherein the green skeleton is first heated to about 300° C. to about 600° C. to slowly and cleanly pyrolyze the lubricant into gaseous compounds. The heating step provides a skeleton having sufficient strength for use in many practical applications. However, for a majority of applications, the skeleton requires additional strength. Skeletons used in these applications are sintered after the heating step, at about 1000° C. to about 1400° C., and preferably about 1100° C. to about 1300° C., for about 0.5 to about 8 hours to bond the acicular metal particles, strengthen the skeleton, and form a sintered skeleton.

If the metal particle mixture contains uncoated acicular metal particles, and is free of an infiltrant powder, the skeleton, or sintered skeleton, is infiltrated by positioning a mass of the infiltrant on a surface of the skeleton, then heating the skeleton and infiltrant mass to a sufficient temperature, and holding at that temperature for a sufficient time, such that the infiltrant melts, and the liquid infiltrant permeates and fills the voids of the skeleton.

The infiltrant mass can be, for example, a solid slug of the infiltrant, or a compressed mass of small infiltrant particles. The melted infiltrant can be positioned at, or near, the top of the skeleton and percolate down through the skeleton, or can be positioned at, or near, the bottom of the skeleton and wick upwardly through the skeleton, or percolate and wick simultaneously.

Typically, the best mechanical properties are observed when the volume of infiltrant in the skeleton is slightly less than, or equal to, the pore volume of the skeleton, because excessive quantities of liquid infiltrant can cause slumping and particle separation of the solid skeleton. Alternatively, insufficient liquid infiltrant leaves residual pores in the skeleton, which reduces density and corrosion resistance. Therefore, the metal skeleton is infiltrated with about 0.1% to about 10%, and preferably about 1% to about 6% of an infiltrant, based on the weight of the final finished metal component. To achieve the full advantage of the present invention, the skeleton is infiltrated with about 2% to about 5% of an infiltrant, based on the weight of the final finished metal component.

In a preferred embodiment, the skeleton is infiltrated with a sufficient amount of infiltrant to completely infiltrate the metal component. A slight excess of infiltrant is acceptable because the excess coats the outer surface of the skeleton to improve corrosion resistance. However, total infiltration may not be necessary to achieve the desired density, conductivity, and corrosion resistance for a particular application. As stated above, large excess amounts of infiltrant can be detrimental. In addition, a large amount of excess infiltrant cannot flow into the skeleton, but drips down the exterior surface of the skeleton to adversely affect the dimensions of the magnetic metal component and is wasted.

Typically, a mass of infiltrant is used to infiltrate a metal skeleton during the heating and sintering steps of the powder metallurgy process. The infiltrant mass is positioned to contact a surface of the skeleton either before or after the heating step that pyrolyzes the lubricant from the skeleton. After the heating step, the skeleton preferably is heated slowly to a temperature of about 1120° C. (e.g., about 1060° C. to about 1180° C.). The metal component is heated slowly (e.g., at a rate of about 10° C. to about 20° C. per minute) to allow the skeleton to attain a homogeneous temperature throughout its volume. Accordingly, when the melting point of the infiltrant is attained, the infiltrant melts and enters the voids of the skeleton by capillary action. If the heating rate of the skeleton is too rapid, the interior portions of the skeleton are relatively cool (compared to the exterior portions of the skeleton) when the infiltrant melts, which results in liquid infiltrant being unable to enter into the relatively cool portions, but rather flows off the exterior of the skeleton.

Figure 3:
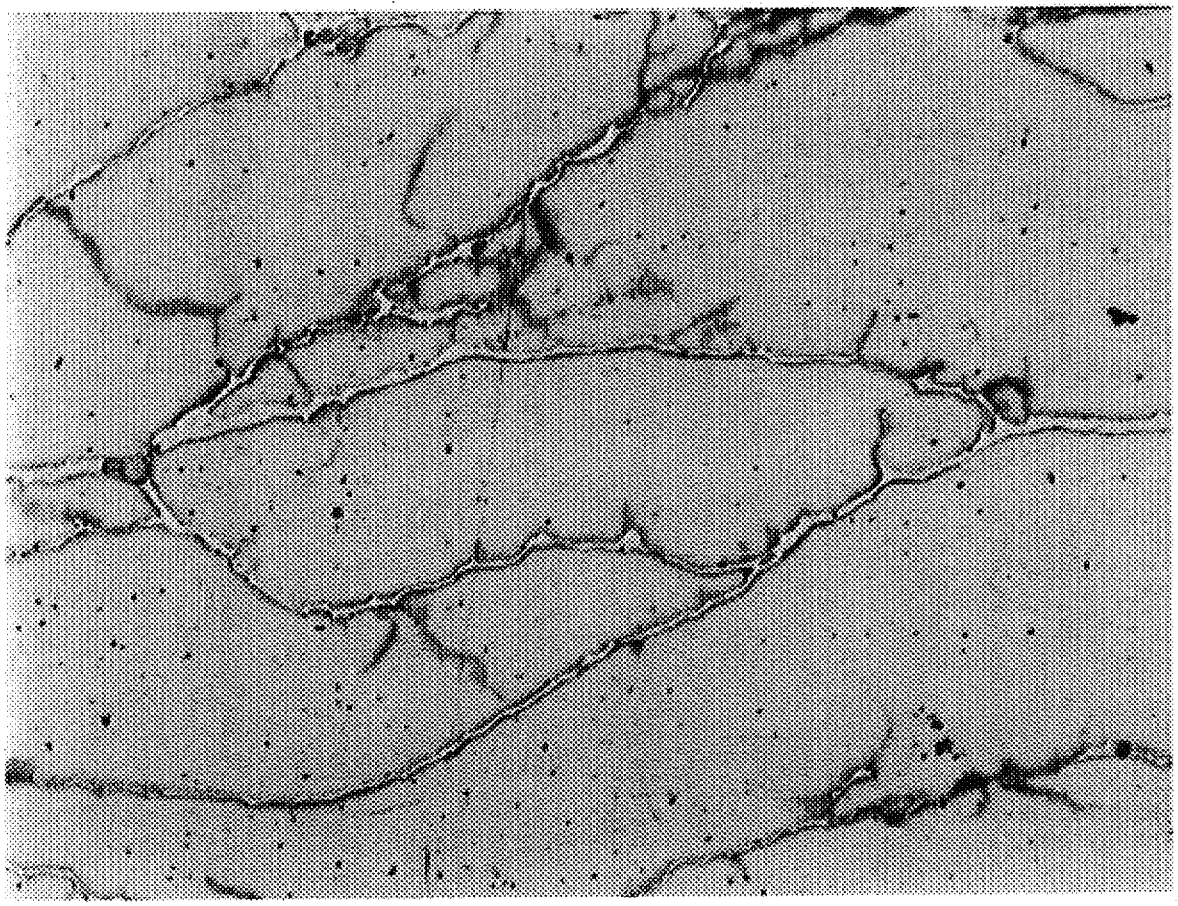
FIG. 3 is a photomicrograph of an infiltrated, magnetic metal component of the present invention.

An infiltrated magnetic metal component of the present invention is illustrated in FIG. 3, showing that a copper infiltrant has filled the voids between the compressed acicular metal particles of an iron-based skeleton. The magnetic metal component in FIG. 3 had a density that is about 97% of theoretical density and demonstrated excellent corrosion resistance. As discussed hereafter, the metal component of FIG. 3, surprisingly, exhibited magnetic properties that were essentially identical to the magnetic properties of an identical, but noninfiltrated, iron-based metal component.

The infiltrant can be any metal, alloy, or mixture of metals and alloys, having a melting point below the melting point of the acicular metal particles of the skeleton. Examples of infiltrants include, but are not limited to, Cu, brass, Cu/Zn (zinc), Cu/Zn/Mn (manganese), Cu/Fe, Cu/Zn/Mn/Fe, Zn, tin (Sn), lead (Pb), aluminum (Al), Cu/Pb, bronze, Cu/Sn, Cu/Mn, Mn/Si (silicon), Cu/Si, Co/Si, bismuth (Bi), cadmium (Cd), antimony (Sb), Ag, and Woods metal. A preferred infiltrant is copper or an alloy of copper.

After the heating, sintering, and infiltrating operations, the resulting magnetic metal component is allowed to cool. After optional secondary operations, like polishing and deburring, the magnetic metal component can be used for its intended application.

Surprisingly, metal articles prepared by the above-described powder metallurgy and infiltration processes can be used as magnetic metal components, for example, in timing mechanisms, housings, armatures, brackets, relaying components, spacers for fuel injection systems, electrical devices, and household goods, and as magnetic cores and switch gear components. The magnetic metal components also can be used in other applications that typically use components manufactured by powder metallurgy. As discussed below, the use of a magnetic metal component prepared by powder metallurgy and infiltration processes is surprising because the magnetic properties of prior metal components prepared by powder metallurgy were destroyed when the component was infiltrated.

To illustrate the manufacture of a magnetic metal component by powder metallurgy and infiltration processes using acicular metal particles, the following metal components were prepared and tested.

First, metal components were manufactured by typical powder metallurgy processes from acicular metal particles disclosed in Krause et al. U.S. Pat. No. 5,594,186 (Example 1), and the magnetic properties of these metal components were compared to published magnetic properties of metal components prepared from conventional spherical metal particles having a size typically used in powder metallurgy (Comparative Example 1). The metal components of Example 1 and Comparative Example 1 were not infiltrated.

The magnetic properties are summarized in Table 1, and show that a powder metallurgy metal component prepared from the acicular metal particles exhibited substantially improved magnetic properties, i.e., a greater $B_{100}$ and a lower $H_c$, compared to a metal component prepared from spherical metal particles having a size typically used in powder metallurgy.

TABLE I

|  | $B_{100}$ | $H_c$ |
|---|---|---|
| Example 1 | 15.2 kG[1] | 1.5 Oe[1] |
| Comparative Example 1[2] | 13.5 kG | 1.7 Oe |

[1]kG is kiloGauss, Oe is Oersteds; and
[2]magnetic properties published in C. Lall, "Soft Magnetism," Metal Powder Industries Federation, Princeton, NJ (1992), page 53.

In the following examples, iron-based skeletons prepared from acicular metal particles were infiltrated with different copper-based infiltrants. The skeletons were prepared in accordance with the examples in U.S. Pat. No. 5,594,186, then the skeletons were completely infiltrated by positioning a mass of the infiltrant on a surface of the skeleton and heating the skeleton.

In particular, Examples 2–5 illustrate a magnetic metal component comprising an iron skeleton prepared from acicular metal particles and a copper-based infiltrant. Each skeleton was infiltrated by heating the skeleton to about 1120° C. in a 20% hydrogen/80% nitrogen atmosphere, and holding the skeleton at about 1120° C. for about 15 minutes to allow the infiltrant to melt and completely infiltrate the skeleton and thereby provide a magnetic metal component. Infiltration increased the density of the skeleton, and corrosion-resistance properties were imparted to the skeleton. The magnetic properties of the infiltrated metal components of Examples 2–5 are summarized in Table 2.

TABLE 2

|  | Infiltrant | $B_{100}$ (kG) | $H_c$ (Oe) |
|---|---|---|---|
| Example 2 | Copper[3] | 15.6 | 1.8 |
| Example 3 | PYRON 681[4] | 15.5 | 1.8 |
| Example 4 | ACuPowder LR 99[5] | 15.5 | 1.9 |
| Example 5 | PYRON 283[6] | 15.9 | 2.0 |

[3]pure copper powder;
[4]alloy of copper, manganese (1.42%), iron (2.15%), and zinc (0.28%), available from Pyron Metal Powders, Inc., Greenback, TN;
[5]alloy of copper, zinc (<3%), and carbonyl iron (1–3%), available from ACuPowder International LLC, Union, NJ; and
[6]alloy of copper and iron (2.0%), available from Pyron Metal Powders, Inc.

The magnetic properties set forth in Table 2 show that the magnetic properties of an infiltrated, magnetic metal component of the present invention: (a) are significantly better than the magnetic properties of a noninfiltrated metal component prepared from spherical metal particles having a size typically used in powder metallurgy (see Comp. Ex. 1 and Table 1), and (b) are essentially the same as a noninfiltrated metal component prepared from acicular metal particles (see Example 1 and Table 1).

The discovery that the magnetic properties of a powder metallurgy metal component prepared from acicular metal particles were not adversely affected by infiltration is both new and unexpected in the art. A prior publication taught that infiltration of a magnetic skeleton prepared by powder metallurgy destroys the magnetic properties of powder metallurgy metal components. The present magnetic metal components, therefore, are an improvement in the art because the components are infiltrated, and thereby resist corrosion, and have excellent magnetic properties. Accordingly, economical magnetic metal components that resist corrosion, and that overcome the problems of prior methods of imparting corrosion resistance, are now available.

Figure 4:
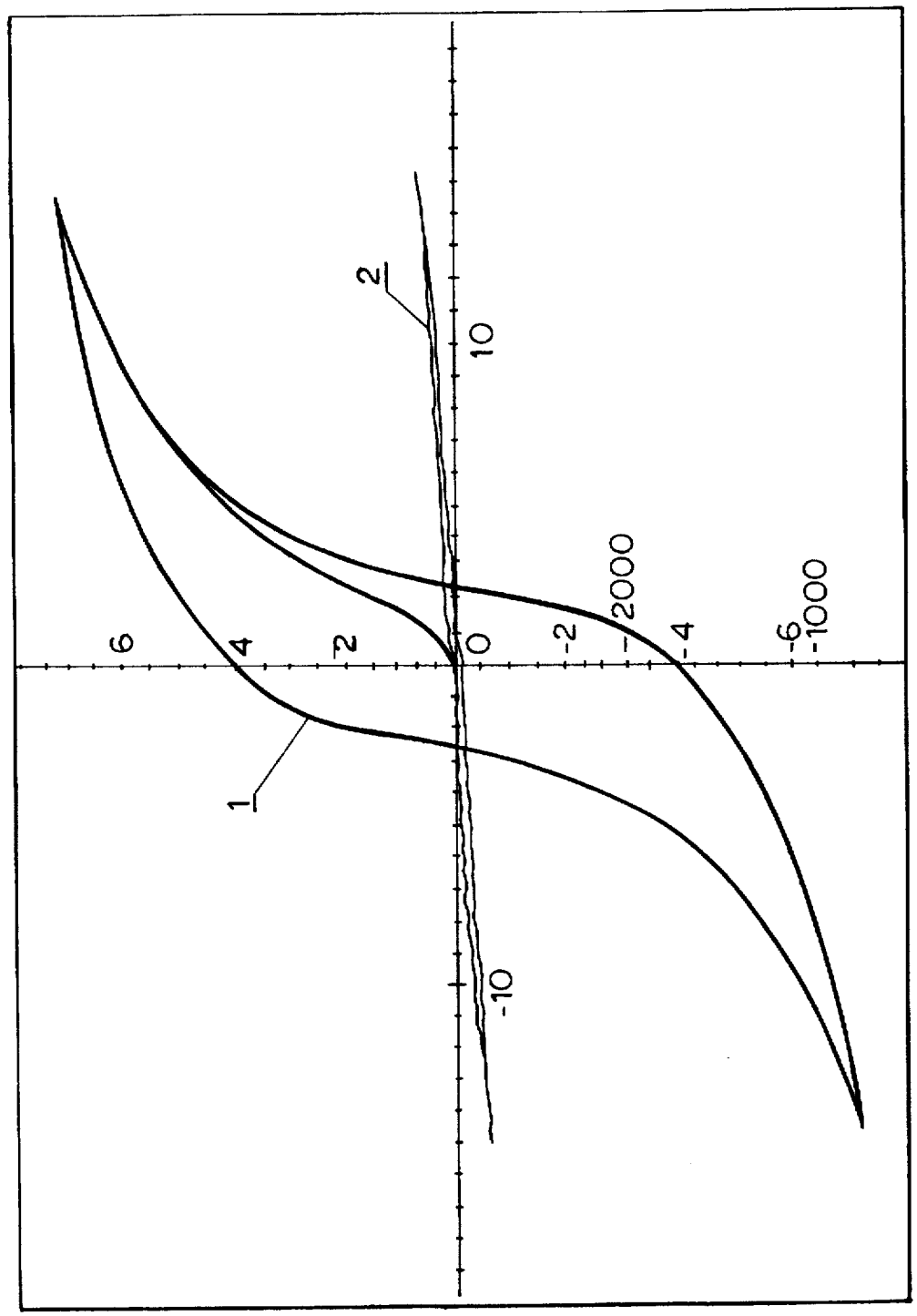
FIG. 4 is a graph of hysteresis loops of prior art noninfiltrated and infiltrated metal components prepared by a powder metallurgy process from spherical metal particles.

In particular, the above-discussed L. I. Frayman publication discloses that infiltration destroys the magnetic properties of powder metallurgy metal components. FIG. 4 is a plot presented in the Frayman publication illustrating that the magnetic properties of stainless steel metal components prepared from spherical stainless steel particles are destroyed by copper infiltration. Plot 1 in FIG. 4 shows the magnetic properties of a noninfiltrated 410L stainless steel metal component prepared by powder metallurgy. Plot 2 in FIG. 4 shows the magnetic properties of a copper-infiltrated 410L stainless steel metal component prepared by powder metallurgy. FIG. 4 illustrates that copper infiltration destroys the magnetic properties of a powder metallurgy metal component prepared from conventional spherical metal particles having a size typically used in powder metallurgy. Table 3 summarizes the magnetic properties disclosed in the L. I. Frayman publication and illustrated in FIG. 4 for the stainless steel metal components manufactured by powder metallurgy from spherical metal particles having a size typically used in powder metallurgy.

TABLE 3[7]

Magnetic Properties of 410L Stainless Steel Metal Components

|  | $B_{15}$ (kG)[8] | $B_r$ (kG)[9] | $H_c$ (Oe)[10] | $\mu_{max}$[11] |
|---|---|---|---|---|
| Sintered/Noninfiltrated | 8.32 | 4.74 | 2.34 | 1090 |
| Sintered/Copper Infiltrated | 0.41 | 0.07 | 2.15 | 600 (60)[12] |

[7]the values in Table 3 were presented in the L. I. Frayman publication;
[8]$B_{15}$ measures induction in a sample subjected to an applied field of 15 Oe;
[9]$B_r$ measures the residual induction in the sample after removal of the applied field;
[10]$H_c$ (coercivity) measures the field necessary to reduce the level of magnetism to zero;
[11]$\mu_{max}$ (maximum permeability, G/Oe) measures the steepest portion of the magnetization curve; and
[12]the data presented in the L. I. Frayman publication was erroneous based on FIG. 4 which also is present in the L. I. Frayman publication, the actual $\mu_{max}$ of the sintered and copper infiltrated stainless steel component was 60 G/Oe.

Figure 5:
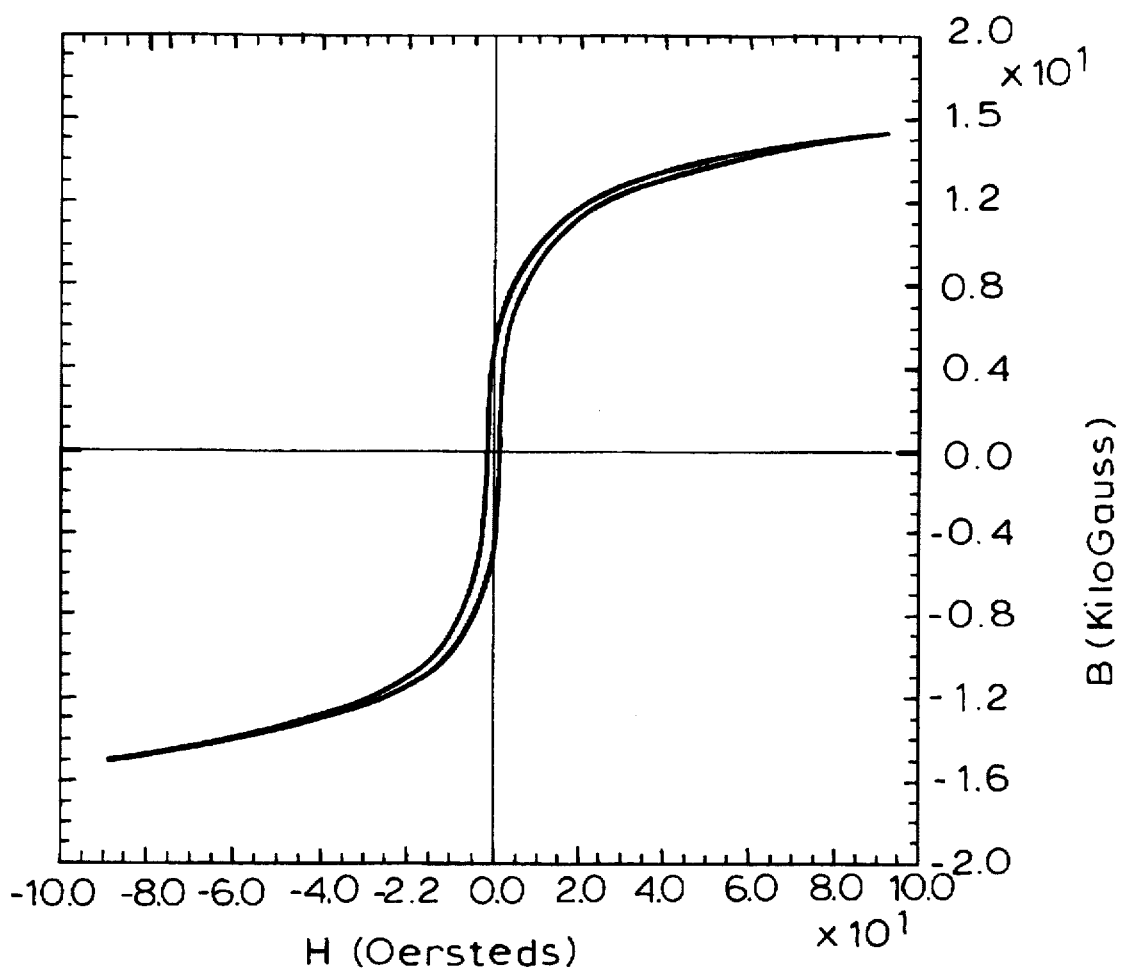
FIG. 5 is a hysteresis loop of an infiltrated metal component of the present invention prepared by a powder metallurgy process from acicular metal particles.

In contrast, a present magnetic metal component, which is prepared by powder metallurgy techniques from acicular metal particles and is infiltrated, exhibits excellent magnetic properties after infiltration. FIG. 5 illustrates that magnetic properties of an infiltrated iron-based metal component of the present invention. The hysteresis loop in FIG. 5 shows that magnetic properties of the infiltrated metal component are retained. The data in Table 4 summarizes the magnetic properties of noninfiltrated and infiltrated metal components prepared from acicular iron particles. The data in Table 4 permits a comparison between the magnetic properties of a present infiltrated metal component and the magnetic properties of a prior art infiltrated metal component, which are set forth in Table 3. A comparison of the magnetic properties summarized in Tables 3 and 4 shows that the acicular metal particles unexpectedly provided a metal component that exhibited excellent magnetic properties, even after copper infiltration.

TABLE 4

Magnetic Properties of Iron-Based Metal Components[13]

|  | $B_{15}$ (kG)[8] | $B_r$ (kG)[9] | $H_c$ (Oe)[10] | $\mu_{max}$[11] |
|---|---|---|---|---|
| Sintered/Noninfiltrated[14] | 8.54 | 2.76 | 1.71 | 810 |
| Sintered/Copper Infiltrated[15] | 8.83 | 2.10 | 1.45 | 881 |

[13]metal component manufactured by powder metallurgy using iron particles disclosed in Krause et al. U.S. Pat. No. 5,594,186;
[14]calculated from data obtained at 20 Oe; and
[15]measured data obtained at 15 Oe.

Accordingly, a magnetic metal component can be prepared by powder metallurgy from the acicular metal particles disclosed in Krause et al. U.S. Pat. No. 5,594,186, and infiltrated, to impart corrosion resistance, increase density, and improve conductivity of the metal component, without adversely affecting magnetic properties. The magnetic properties of the infiltrated metal component are essentially equal to the magnetic properties of a corresponding noninfiltrated metal component. Such results are both new and unexpected in the art.

The following Example 6 further shows that magnetic properties are retained in an infiltrated magnetic metal component of the present invention.

EXAMPLE 6

A ring was pressed from iron particles disclosed in Krause et al. U.S. Pat. No. 5,594,186, then sintered at 1120° C. for two hours in a hydrogen atmosphere. After sintering, the ring was infiltrated with copper by reheating the ring to 1120° C. for 15 minutes in a hydrogen atmosphere. Complete infiltration of the ring occurred. The magnetic properties of the infiltrated ring were excellent, i.e., $B_{100}$ was 15.3 kG and $H_c$ was 2.4 Oe. For comparison, the magnetic properties of an identical, but noninfiltrated, sintered ring were $B_{100}$-15.2 kG and $H_c$-2.4 Oe. The infiltrated ring had excellent corrosion resistance properties. The noninfiltrated ring oxidized rapidly.

The magnetic metal components of the present invention exhibit numerous advantageous properties of prior metal components prepared by powder metallurgy and infiltration. For example, a green skeleton prepared from the acicular metal particles is very dense, i.e., at least 95% theoretical density, and, accordingly, has a low porosity. The amount of infiltrant needed to impart corrosion resistance, therefore, is low (i.e., about 0.1% to about 10% by weight) compared to prior art skeletons that are more porous and less dense, and, accordingly, require up to 25% by weight of an infiltrant.

Another advantageous property is that infiltration of a skeleton prepared from acicular metal particles does not swell the skeleton. The present skeletons are prepared from relatively large acicular metal particles, and, therefore, the skeleton has a lower pore volume to infiltrate. The acicular metal particles also provide a dense skeleton and, unlike prior art spherical particles of 200 μm or less, have a shape that resists movement during infiltration, and, consequently, resists swelling.

It is important to minimize or eliminate swelling during infiltration in order to avoid dimensional changes in the final metal component, which would have to be overcome by designing swelling tolerances into the dimension of the skeleton, or by performing secondary processes, like polishing, to obtain a metal component of the correct dimensions. Secondary processes are disadvantageous because such processes remove the infiltrant from the exterior of the metal component, which can result in corrosion.

In addition, it is theorized that the shape and size of the acicular metal particles minimizes reactions between the infiltrant and the skeleton. Such reactions can adversely affect the magnetic properties of the metal component, and are to be minimized or avoided. A volume of the acicular particles has a low surface area compared to a volume of spherical particles having a size typically used in powder metallurgy, which provides a dense skeleton requiring less infiltrant, and, in turn, a reduced possibility of a skeleton-infiltrant reaction.

Obviously, many modifications and variations of the invention as hereinbefore set forth can be made without departing from the spirit and scope thereof, and, therefore, only such limitations should be imposed as are indicated by the appended claims.

What is claimed is:

1. A soft magnetic metal component prepared by a powder metallurgy process from a volume of acicular metal particles having a total surface area-to-weight ratio that is less than about one-fifth of a total surface area-to-weight ratio of an identical volume of spherical particles having a size of about 200 microns or less of the same metal, and infiltrated with a metal, an alloy, or a mixture thereof.

2. The magnetic component of claim 1 wherein the acicular metal particles are substantially linear, nonspiralled, and have a substantially triangular cross section.

3. The magnetic metal component of claim 1 having magnetic properties that are sufficient for soft magnetic applications.

4. The magnetic metal component of claim 1 having magnetic properties that are essentially equal to an identical, noninfiltrated magnetic metal component.

5. The magnetic metal component of claim 1 having an induction at an applied field of 15 Oersteds of at least 50% of an identical, noninfiltrated magnetic metal component.

6. The magnetic metal component of claim 1 having an induction at an applied field of 15 Oersteds of at least 75% of an identical, noninfiltrated magnetic metal component.

7. The magnetic metal component of claim 1 having an induction at an applied field of 15 Oersteds of at least 90% of an identical, noninfiltrated magnetic metal component.

8. The magnetic metal component of claim 1 wherein the acicular metal particles comprise iron, iron containing 0.05% to 1.5% phosphorus, an iron/aluminum alloy, an iron/silicon alloy, an iron/nickel alloy, a ferritic stainless steel, cobalt, an iron/copper alloy, a nickel/cobalt alloy, and mixtures thereof.

9. The magnetic metal component of claim 1 wherein the acicular metal particles comprise iron.

10. The magnetic metal component of claim 9 having an induction at an applied field of 100 Oersteds of at least about 12 kiloGauss, and a coercive force measured from an applied field of 100 Oersteds of about 5 Oersteds or less.

11. The magnetic metal component of claim 9 having an induction at an applied field of 100 Oersteds of about 12 to about 20 kiloGauss, and a coercive force measured from an applied field of 100 Oersteds of about 0.5 to about 5 Oersteds.

12. The magnetic metal component of claim 9 wherein the iron is alloyed with phosphorus, aluminum, silicon, nickel, or copper.

13. The magnetic metal component of claim 1 infiltrated with a metal or alloy comprising Cu, brass, Cu/Zn, Cu/Zn/Mn, Cu/Fe, Cu/Zn/Mn/Fe, Zn, Sn, Pb, Al, Cu/Pb, bronze, Cu/Sn, Cu/Mn, Mn/Si, Cu/Si, Co/Si, Bi, Cd, Sb, Ag, Woods metal, and mixtures thereof.

14. The magnetic metal component of claim 1 infiltrated with about 0.1% to about 10% by weight of the metal, alloy, or mixture thereof.

15. The magnetic metal component of claim 1 infiltrated with about 1% to about 6% by weight of the metal, alloy, or mixture thereof.

16. A method of manufacturing a soft magnetic metal component comprising:
(a) forming a metal particle mixture, said metal particle mixture comprising:
  (i) a volume of acicular metal particles having a total surface area-to-weight ratio that is less than about one-fifth of a total surface area-to-weight ratio of an identical volume of spherical particles having a size of about 200 microns or less, and infiltrated with a metal, an alloy, or a mixture thereof, and
  (ii) 0% to about 0.5% by weight of a lubricant;
(b) subjecting the metal particle mixture to a pressing operation to form a green skeleton;
(c) subjecting the green skeleton to a heating operation for a sufficient time and at a sufficient temperature to pyrolyze the lubricant and to form a skeleton;
(d) optionally, subjecting the skeleton to a sintering operation for a sufficient time and at a sufficient temperature to form a sintered skeleton; and
(e) infiltrating the skeleton of step (c) or the sintered skeleton of step (d) with a metal or alloy infiltrant to provide the magnetic metal component.

17. The method of claim 16 wherein the acicular metal particles are substantially linear, nonspiralled, and have a substantially triangular cross section.

18. The method of claim 16 wherein step (e) is performed after step (c).

19. The method of claim 16 wherein step (e) is performed simultaneously with steps (c) and (d).

20. The method of claim 16 wherein step (e) is performed simultaneously with step (d).

21. The method of claim 16 wherein the pressing operation is a uniaxial pressing operation.

22. The method of claim 17 wherein the pressing operation provides a green skeleton having a density at least 95% of the theoretical density of the metal component.

23. The method of claim 17 wherein the acicular metal particles have a substantially triangular cross section and a height-to-base ratio of about 0.08:1 to about 1:1.

24. The method of claim 17 wherein the acicular metal particles have a length-to-base ratio of at least 3 to 1.

25. The method of claim 17 wherein the acicular metal particles have a length of about 0.006 to about 0.20 inches, a base of about 0.002 to about 0.05 inches, and a height of about 0.002 to about 0.05 inches.

26. The method of claim 17 wherein the acicular metal particles, when viewed from a point in the center of the particle, have a first longitudinal surface that is concave, a second longitudinal surface that is convex, and a third longitudinal surface that is planar or concave.

27. The method of claim 26 wherein the third longitudinal surface is planar.

28. The method of claim 16 wherein the metal particle mixture comprises at least 99.5% by weight acicular metal particles.

29. The method of claim 16 wherein the metal particle mixture further comprises:
(iii) about 0.1% to about 10% by weight of an infiltrant selected from the group consisting of a metal, an alloy, and mixtures thereof, in a powdered form.

30. The method of claim 16 wherein the acicular metal particles are coated with about 0.1% to about 10% by weight of an infiltrant selected from the group consisting of a metal, an alloy, and mixtures thereof.

31. The method of claim 16 wherein the skeleton of step (c) or the sintered skeleton of step (d) is infiltrated by contacting a surface of the skeleton with a mass of the infiltrant, and heating the skeleton and the infiltrant mass to a sufficient temperature and for a sufficient time to melt the infiltrant and allow the infiltrant to permeate voids in the skeleton.

32. The method of claim 31 wherein the skeleton and infiltrant are heated to about 1060° C. to about 1180° C. for about 10 to about 60 minutes.

33. The method of claim 16 wherein the infiltration step increases the volume of the skeleton or the sintered skeleton by about 2% or less.

34. A magnetic metal component manufactured by the method of claim 16.

35. The magnetic metal component of claim 34 having an induction at an applied field of 15 Oersteds of at least 50% of an identical, noninfiltrated magnetic metal component.

36. The magnetic metal component of claim 34 having an induction at an applied field of 15 Oersteds of at least 75% of an identical, noninfiltrated magnetic metal component.

37. The magnetic metal component of claim 34 having an induction at an applied field of 15 Oersteds of at least 90% of an identical, noninfiltrated magnetic metal component.

* * * * *